United States Patent
Mohri et al.

(10) Patent No.: US 6,838,633 B1
(45) Date of Patent: Jan. 4, 2005

(54) METHOD AND APPARATUS FOR ELECTRODISCHARGE MACHINING

(75) Inventors: Naotake Mohri, 1-50-3, Cyuuou, Nakano-ku, Tokyo 164-0111 (JP); Nagao Saito, Tokyo (JP); Hajime Ogawa, Tokyo (JP); Kiyohito Kamiya, Tokyo (JP)

(73) Assignees: Mitsubishi Denki Kabushiki Kaisha, Tokyo (JP); Naotake Mohri, Tokyo (JP)

( * ) Notice: Subject to any disclaimer, the term of this patent is extended or adjusted under 35 U.S.C. 154(b) by 0 days.

(21) Appl. No.: 10/344,941
(22) PCT Filed: Sep. 13, 2000
(86) PCT No.: PCT/JP00/06277
§ 371 (c)(1), (2), (4) Date: Feb. 19, 2003
(87) PCT Pub. No.: WO02/24388
PCT Pub. Date: Mar. 28, 2002

(51) Int. Cl.$^7$ ............................. B23H 7/20; B23H 7/18
(52) U.S. Cl. ............................ 219/69.17; 219/69.13; 219/69.16
(58) Field of Search .................. 219/69.13, 69.16, 219/69.17

(56) References Cited

U.S. PATENT DOCUMENTS

| | | | | |
|---|---|---|---|---|
| 3,627,968 A | * | 12/1971 | Sennowitz | 219/69.13 |
| 3,755,645 A | * | 8/1973 | Kauffman | 219/69.13 |
| 5,118,915 A | | 6/1992 | Magara | |
| 5,598,075 A | * | 1/1997 | Liang et al. | 318/571 |

FOREIGN PATENT DOCUMENTS

| | | |
|---|---|---|
| JP | 62-10769 | 3/1987 |
| JP | 62-10769 B2 * | 3/1987 |
| JP | Hei 3-251322 | 11/1991 |
| JP | Hei 4-35811 | 2/1992 |
| JP | 4-183525 | 6/1992 |
| JP | 5-329711 | 12/1993 |
| JP | 8-267323 A * | 10/1996 |

OTHER PUBLICATIONS

"Mechanics Of Electric Discharge Machining And Method for Making 100% Use Of The Same," pp. 45–47, (published by Gijutsu–Hyohron Co., Ltd), no publication date.

* cited by examiner

Primary Examiner—Geoffrey S. Evans
(74) Attorney, Agent, or Firm—Sughrue Mion, PLLC

(57) ABSTRACT

An electric discharge machining apparatus for supplying machining electric power to a gap between an electrode (1) and a workpiece (2). The apparatus includes a gap dimension detection device (8) for detecting a dimension of the gap, a gap average voltage detection device (11) for detecting an average voltage of the gap, a gap dimension correction device (13) for correcting the dimension of the gap, and a gap dimension correction starting device (12) for starting the gap dimension correction device (13) when a first comparison between a detected gap dimension and a predetermined allowable value and a second comparison between a detected gap average voltage and a predetermined reference average voltage are made and the gap dimension detected by the first comparison is larger than the predetermined allowable value and the gap average voltage detected by the second comparison is smaller than the predetermined reference average voltage.

11 Claims, 5 Drawing Sheets

FIG. 3

| WORKPIECE | ELECTRODE | EXPERIMENTAL FORMULA FOR OBTAINING GAP DIMENSION (μm) |
|---|---|---|
| STEEL (−) | COPPER (+) | $3.7 \cdot (1.6 \cdot I_p^{0.43} \cdot \tau_p^{0.38})^{0.9}$ |
| STEEL (−) | GRAPHITE (+) | $10 \cdot (1.1 \cdot I_p^{0.44} \cdot \tau_p^{0.42})^{0.64}$ |
| STEEL (+) | GRAPHITE (−) | $10.4 \cdot (1.5 \cdot I_p^{0.44} \cdot \tau_p^{0.36})^{0.58}$ |

$I_p$: PEAK VALUE OF ELECTRIC DISCHARGE CURRENT
$\tau_p$: PULSE WIDTH OF ELECTRIC DISCHARGE CURRENT

FIG. 4

| $I_p$ | $\tau_p$ | ALLOWABLE VALUE OF GAP DIMENSION |
|---|---|---|
| 1A | 2μs | 7.16μs |
| 2A | 4μs | 11.87μs |
| ⋮ | ⋮ | ⋮ |

US 6,838,633 B1

METHOD AND APPARATUS FOR ELECTRODISCHARGE MACHINING

TECHNICAL FIELD

This invention relates to improvements in electric discharge machining method and apparatus for supplying machining electric power to a gap between an electrode and a workpiece and machining the workpiece. Particularly, it relates to improvements in electric discharge machining method and apparatus for performing control of a gap dimension by obtaining the gap dimension through direct measurement or calculation.

BACKGROUND ART

Gap control in a conventional electric discharge machining apparatus is performed so that a predetermined reference average voltage is provided and a gap average voltage of a supply voltage is approximated to this reference average voltage. FIG. 6 is an explanatory diagram showing a relation among a gap voltage, the gap average voltage and a gap dimension in such conventional gap control, and FIG. 6(a) shows the gap voltage, and FIG. 6(b) shows the gap average voltage, and FIG. 6(c) shows the gap dimension. In the case (for example, corresponding to an interval T2 in the drawing) that a work product such as work scraps accumulates in the gap and an electric discharge tends to occur, the gap average voltage becomes small as shown in FIG. 6(b) even when the gap dimension does not become small, so that control is performed in the direction that increases the gap dimension as shown in FIG. 6(c). Thus, the accumulation of the work product such as work scraps in the gap becomes a factor in reducing machining accuracy of a machining depth and so on.

Particularly, in powder mixture electric discharge machining, there was a problem that when machining proceeds with an increase in a work product such as work scraps in the gap left standing since the machining is stable, a gap dimension becomes too large and even in the case of machining on the same machining condition, a machining depth or a clearance of the side varies largely. In the powder mixture electric discharge machining, there is a report that the gap dimension becomes, for example, the order of 15 μm to 50 μm with respect to variations in the gap dimension due to accumulation of the work product such as work scraps in the gap.

One example of a work scrap concentration of a gap is calculated with respect to the case of finishing machining with an extremely low machining speed (the case that an electrode area is 100 cm$^2$ and a gap dimension is 10 μm and a peak value Ip of an electric discharge current is 1 A and an average current value I is 0.2 A and a workpiece (negative polarity) is steel and an electrode (positive polarity) is copper). Work scraps W are calculated using W≅0.0097.Ip.I (g/min) which is an experimental formula and when it is assumed that volume of machining liquid of the gap is V (1), a work scrap concentration CON of the gap after 1 minute of machining becomes CON=W/V=(0.0097×1×0.2)/(100× 10×10$^{-7}$)=19.4(g/l). This calculation example indicates that the work scrap concentration of the gap increases in a short time regardless of the case of the finishing machining with an extremely low machining speed. Also, since a carbon product by electrode consumption scraps and decomposition of the machining liquid is added to this work scrap concentration CON, an actual concentration becomes several times the calculation value CON. Due to such an increase in the concentration of work scraps etc. in the gap, the gap dimension becomes large and machining accuracy reduces.

Also, the so-called electrode jump operation in which ejection of the work scraps etc. and replacement of the machining liquid of the gap are performed by rapidly jumping the electrode with respect to the workpiece at a rate of one time per several seconds to several tens of seconds is performed, but since a jump interval is determined by experience of individual operators, there was a problem that a reduction in machining productivity is caused since machining pauses during the jump operation when the jump operation is performed with frequency higher than required and a reduction in machining accuracy is caused when the jump operation is performed with low frequency.

An electric discharge machining method by powder mixture machining liquid for actually measuring a gap dimension is disclosed in JP-A-3-251322, and an electric discharge machining apparatus for measuring rise time of a pulse-shaped voltage and detecting a gap dimension by calculation from an electrode area and a dielectric constant of a gap, etc. is disclosed in JP-A-4-35811. When control is performed so that the gap dimension detected thus is approximated to a predetermined value, for example, even in case that an electric discharge has become unstable due to some factor, information that the electric discharge is unstable cannot be obtained in control by only the gap dimension and as a result, there was a problem that machining accuracy, particularly a surface property reduces.

DISCLOSURE OF THE INVENTION

This invention is implemented to solve the problems as described above, and an object of the invention is to obtain electric discharge machining method and apparatus capable of achieving improvements in both of machining accuracy and machining productivity.

An electric discharge machining method according to this invention is characterized in that in an electric discharge machining method for supplying machining electric power to a gap between an electrode and a workpiece and performing control so as to approximate an average voltage of the gap to a predetermined reference average voltage and machining the workpiece, when a dimension of the gap is larger than a predetermined allowable value and the average voltage of the gap is smaller than the predetermined reference average voltage, the dimension of the gap is corrected.

Also, an electric discharge machining method according to this invention is characterized in that the predetermined allowable value is set according to machining conditions.

An electric discharge machining apparatus according to this invention is characterized in that in an electric discharge machining apparatus for supplying machining electric power to a gap between an electrode and a workpiece and machining the workpiece, there are provided gap dimension detection means for detecting a dimension of the gap, gap average voltage detection means for detecting an average voltage of the gap, gap dimension correction means for correcting the dimension of the gap, and gap dimension correction starting means for starting the gap dimension correction means when a first comparison between a gap dimension detected by the gap dimension detection means and a predetermined allowable value and a second comparison between a gap average voltage detected by the gap average voltage detection means and a predetermined reference average voltage are made and the gap dimension detected by the first comparison is larger than the predetermined allowable value and the gap average voltage detected by the second comparison is smaller than the predetermined reference average voltage.

Also, an electric discharge machining apparatus according to this invention is characterized in that the predetermined allowable value compared with the detected gap dimension is set according to machining conditions.

Also, an electric discharge machining apparatus according to this invention is characterized in that the predetermined allowable value compared with the detected gap dimension is set to a calculation value by an experimental formula previously obtained according to machining conditions or a value in which this calculation value is multiplied by a predetermined coefficient.

Also, an electric discharge machining apparatus according to this invention is characterized in that the gap dimension correction means is jump means for jumping the electrode relatively to the workpiece or means for jetting machining liquid in the gap.

Also, an electric discharge machining apparatus according to this invention is characterized in that the gap dimension correction means is reference average voltage change means for changing the reference average voltage smaller than an initial setting.

Since the electric discharge machining method and apparatus according to this invention are constructed as described above, the gap dimension can be maintained substantially constant within the allowable accuracy range while holding stability of electric discharge, so that machining accuracy can be improved. Also, when the gap dimension is within the allowable range, the electric discharge is continued, and only when the gap dimension exceeds the allowable range and the gap average voltage is smaller than the reference average voltage, the gap dimension is corrected and a useless correction operation of the gap dimension is eliminated, so that machining time can be shortened and machining productivity can be improved.

BRIEF DESCRIPTION OF THE DRAWINGS

FIG. 3 is a diagram showing an example of an experimental formula for obtaining a gap dimension from a peak value Ip and a pulse width τp of an electric discharge current.

FIG. 4 is a diagram showing an example of an allowable value table of a gap dimension according to a peak value Ip of an electric discharge current and a value of a pulse width τp of an electric discharge current.

BEST MODE FOR CARRYING OUT THE INVENTION

First Embodiment

Figure 1:
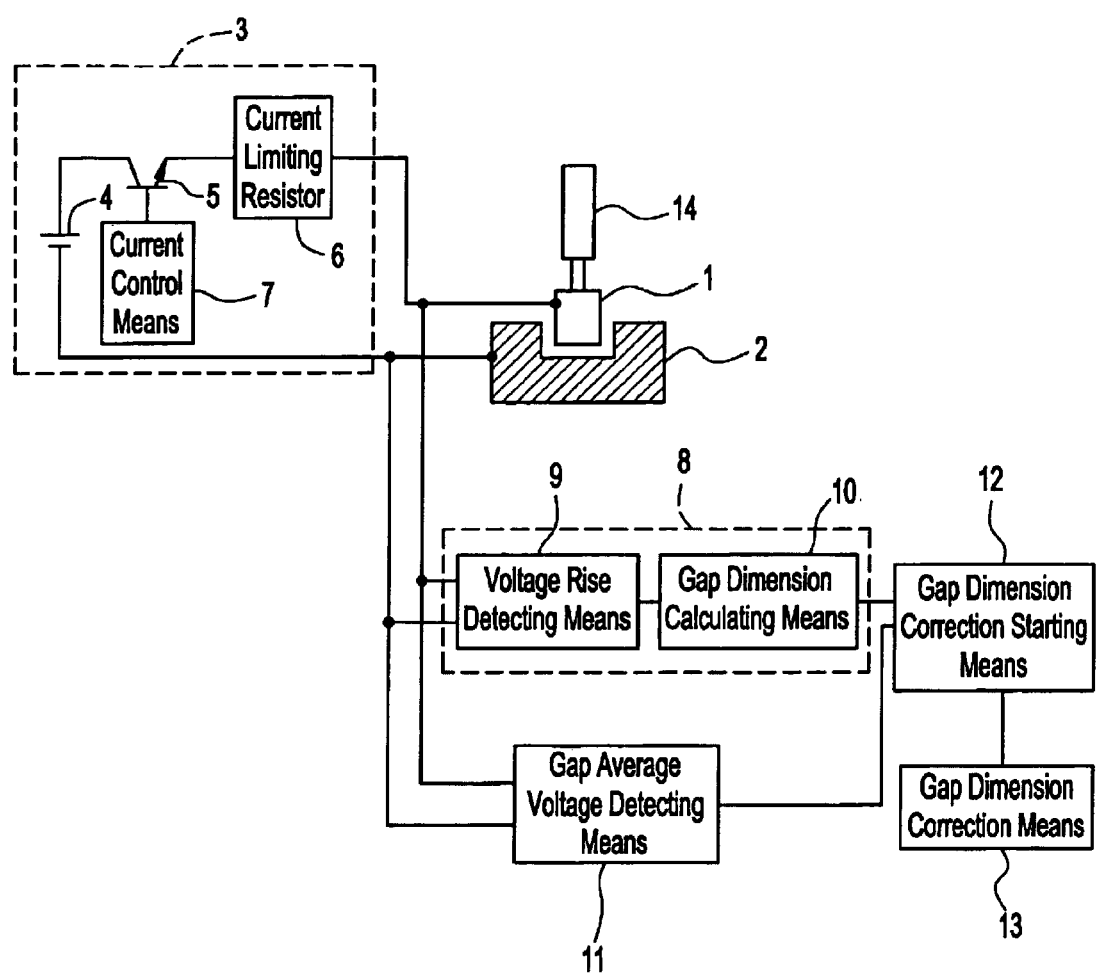
FIG. 1 is a configuration diagram showing an electric discharge machining apparatus according to this invention.

FIG. 1 is a configuration diagram of an electric discharge machining apparatus according to a first embodiment of this invention and in the diagram, numeral 1 is an electrode, and numeral 2 is a workpiece, and numeral 3 is machining electric power supply means, and numeral 4 is a DC power source, and numeral 5 is a switching element, and numeral 6 is a current limiting resistor, and numeral 7 is current control means, and numeral 8 is gap dimension detection means, and numeral 9 is voltage rise detection means, and numeral 10 is gap dimension calculation means, and numeral 11 is gap average voltage detection means, and numeral 12 is gap dimension correction starting means, and numeral 13 is gap dimension correction means, and numeral 14 is machining shaft driving means. The workpiece 2 is fixed in a machining bath (not shown) and also is immersed in machining liquid (not shown).

The gap dimension detection means 8 is constructed of the voltage rise detection means 9 and the gap dimension calculation means 10 and, for example, in a manner similar to a method disclosed in JP-A-4-35811, a gap dimension can be obtained by the gap dimension detection means 8. That is, it is assumed that C is capacitance and $\in$ is a dielectric constant of a gap and S is an opposed area between the electrode and the workpiece and G is a gap dimension and R is a resistance value of the machining electric power supply means and E is a power source voltage and t is rise time from voltage application to voltage Vr, and t is detected by the voltage rise detection means 13 and $\in$, S, E, Vr are known, so that by the gap dimension calculation means 10, the gap dimension G can be obtained by performing calculation using relation expressions of $C=\in\cdot(S/G)$ and $Vr=E\cdot(1-\exp(-(t/RC)))$.

The gap dimension detected by the gap dimension detection means 8 as described above is inputted to the gap dimension correction starting means 12.

Also, a gap average voltage detected by the gap average voltage detection means 11 is inputted to the gap dimension correction starting means 12.

When the gap dimension inputted to the gap dimension correction starting means 12 is larger than a predetermined allowable value and the gap average voltage inputted to the gap dimension correction starting means 12 is smaller than a reference average voltage preset by an NC apparatus or memory, etc. (not shown), the gap dimension correction starting means 12 sends a starting signal to the gap dimension correction means 13. By the gap dimension correction means 13 receiving this starting signal, the gap dimension is corrected.

Figure 2:
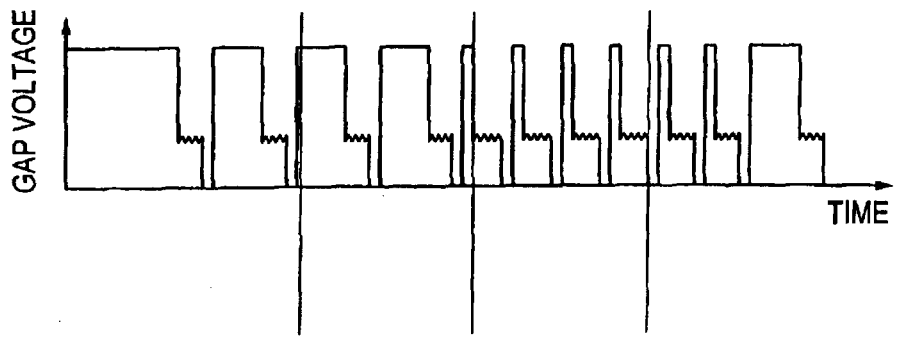
FIGS. 2(a) through 2(d) are timing charts describing an operation of an electric discharge machining apparatus according to a first embodiment of this invention.
Figure 2:
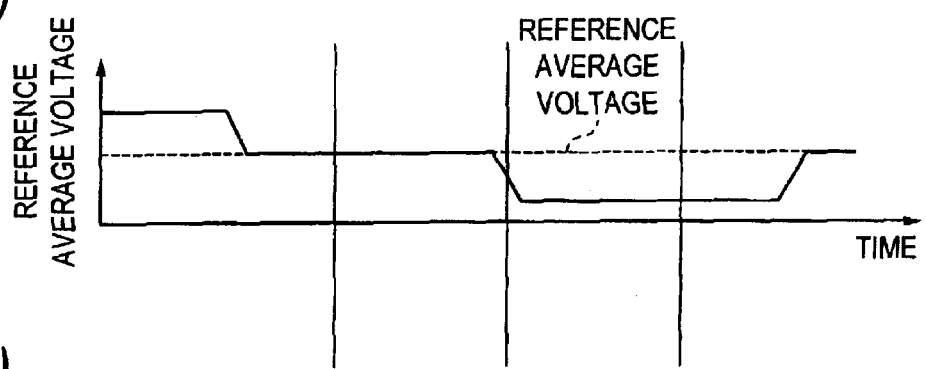
Figure 2:
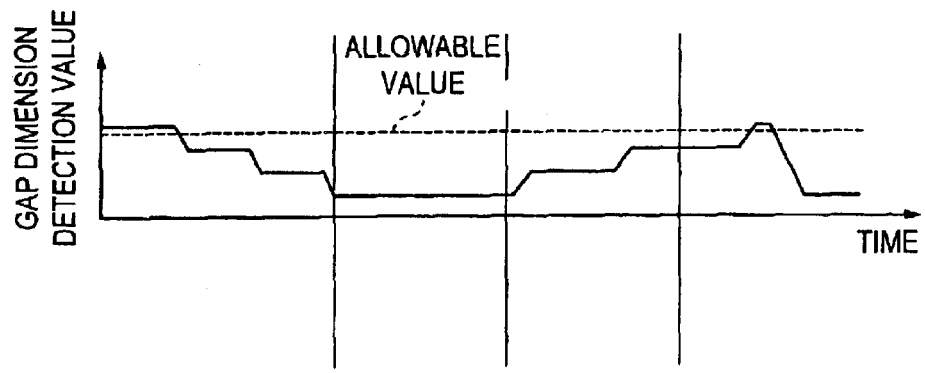
Figure 2:
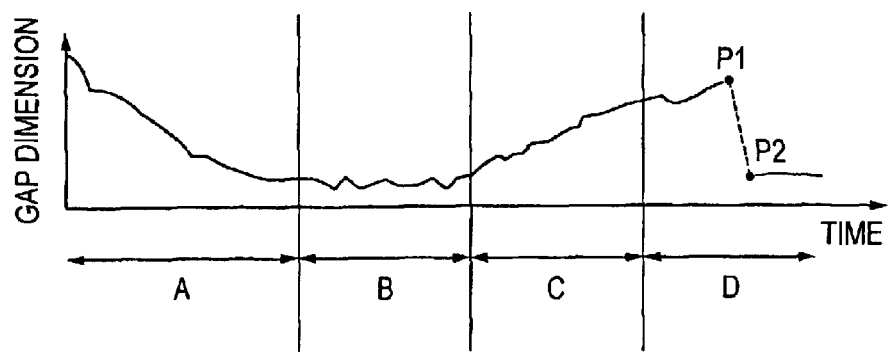

FIG. 2 is a timing chart describing an operation of the electric discharge machining apparatus according to the first embodiment of this invention, and FIG. 2(a) shows a gap voltage and FIG. 2(b) shows a gap average voltage (an output value of the gap average voltage detection means 11) and FIG. 2(c) shows a gap dimension detection value (an output value of the gap dimension detection means 8) and FIG. 2(d) shows a gap dimension.

In an interval A in FIG. 2, a gap dimension is large and also a gap average voltage is larger than a reference average voltage, so that it is in a state in which an electric discharge is resistant to occurrence and the gap dimension is too large to perform the electric discharge efficiently. Therefore, control is performed so as to reduce the gap dimension.

In an interval B, the gap average voltage is on the order of the reference average voltage and the gap dimension is also within an allowable value, so that machining is stably performed and it becomes a proper gap dimension which is substantially uniform with respect to machining progress. Therefore, control is performed so as to hold the gap dimension.

In an interval C, the gap dimension is within the allowable value but the gap average voltage becomes smaller than the reference average voltage. In this case, work scraps etc. generated in the gap increase and a no-load state becomes short and when this continues, it becomes a factor in reducing machining accuracy due to electric discharge concentration or a short-circuit phenomenon. Therefore, control is performed so as to increase the gap dimension.

In an interval D, the amount of work scraps present in the gap increases due to secondary electric discharge etc. through the work scraps further and as a result of increasing the gap dimension in a manner similar to the interval C, the case that the gap dimension detection value has exceeded the allowable value (interval D of FIG. 2(c)) is shown. When the gap average voltage is smaller than the reference average voltage and the gap dimension is larger than the allowable value thus, the gap dimension is corrected to a value proper for electric discharge machining by the gap dimension correction means 13 (P1→P2 of FIG. 2(d)).

As the gap dimension correction means 13, for example, jump means for jumping the electrode 1 relatively to the workpiece 2 can be used.

When the jump means which is the gap dimension correction means 13 is started, the gap dimension is large and a reduction in machining accuracy is caused and also many work scraps are present in the gap, so that it is in a state in which electric discharge concentration or a short-circuit phenomenon tends to occur. Therefore, by performing ejection of the work scraps or replacement of the machining liquid inside the gap by a jump operation, the proper gap dimension is maintained in order to improve machining accuracy and the electric discharge concentration or the short-circuit phenomenon, etc. can be avoided.

As described above, when the gap dimension is larger than the predetermined allowable value and the gap average voltage is smaller than the reference average voltage, by correcting the gap dimension by the gap dimension correction means 13, the gap dimension can be maintained constant within the allowable accuracy range. Also, when the gap dimension is within the allowable range, the electric discharge is continued, and only when the gap dimension exceeds the allowable range and the gap average voltage is smaller than the reference average voltage, the gap dimension is corrected by the jump means, so that a useless correction operation of the gap dimension is eliminated and machining time can be shortened. Therefore, machining productivity can be improved.

Next, a setting method of an allowable value of a gap dimension will be described. Since the gap dimension depends on machining conditions, it is necessary to change the allowable value of the gap dimension according to the machining conditions in order to maintain machining accuracy exactly. FIG. 3 shows an example of an experimental formula for obtaining the gap dimension from a peak value Ip and a pulse width ϵp of an electric discharge current, and the gap dimension changes depending on the peak value Ip of the electric discharge current, the pulse width τp of the electric discharge current, material of the workpiece, material of the electrode and polarity thus, so that it is also necessary to change the allowable value of the gap dimension. Also, in the case of powder mixture electric discharge machining, the gap dimension greatly changes depending on kinds of powder, so that the allowable value must also be changed and set accordingly. An example of a gap dimension according to the machining conditions is previously obtained by experiment and the allowable value of the gap dimension can be set by this gap dimension. For example, when the workpiece is steel (negative polarity) and then electrode is copper (positive polarity), using an experimental formula of the uppermost line of FIG. 3, a calculation value by this experimental formula or a value in which the calculation value by this experimental formula is multiplied by a predetermined coefficient may be set as the allowable value of the gap dimension. In such a case, for example, an allowable value table of the gap dimension according to peak values Ip of the electric discharge current and values of pulse widths τp of the electric discharge current as shown in FIG. 4 is created and the allowable value of the gap dimension can be changed by this table.

By preparing plural allowable value tables of the gap dimension depending on electrical conditions, machining methods and machining conditions of kinds etc. of powder mixed into machining liquid, a proper gap dimension can be set with respect to each condition.

In the above description, the case of using the jump means as the gap dimension correction means 13 has been described, but means etc. for jetting machining liquid in a gap to replace the machining liquid may be used as other gap dimension correction means.

Also, in the above description, the case of obtaining the gap dimension by the gap dimension detection means 8 constructed of the voltage rise detection means 9 and the gap dimension calculation means 10 has been described, but, for example, as disclosed in JP-A-3-251322, a gap dimension during machining may be measured by once stopping machining during machining and removing work scraps etc. attaching to a workpiece and then making contact between an electrode and the workpiece.

Second Embodiment

FIG. 1 is also a configuration diagram of an electric discharge machining apparatus according to a second embodiment of this invention, and each numeral in the diagram is similar to the description of FIG. 1 in the first embodiment. Also, a workpiece 2 is fixed in a machining bath (not shown) and also is immersed in machining liquid (not shown).

When machining continues for a long time, a state in which an electric discharge tends to be started is reached by an increase in work scrap concentration with respect to the machining liquid of the whole machining bath, an increase in concentration of a carbon product generated by thermal decomposition of the machining liquid, an increase in temperature of the machining liquid and so on. Under such circumstances, even when ejection of the work scraps is promoted using jump means etc. as the gap dimension correction means 13 as shown in the first embodiment, a gap average voltage becomes relatively small and a gap dimension becomes large. In such a case, a reference average voltage does not adapt to an allowable value of the gap dimension. As a result of this, it is effective to use reference average voltage change means as the gap dimension correction means 13 so as to hold the gap dimension properly.

Figure 5:
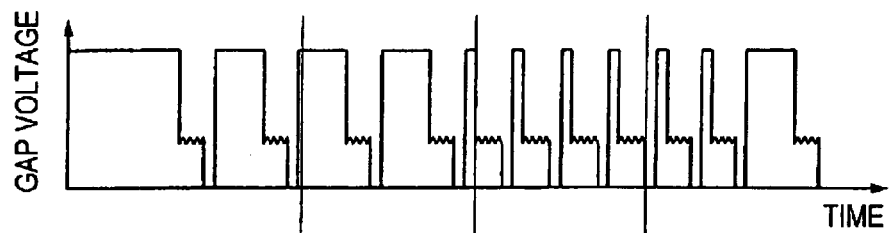
FIGS. 5(a) through 5(d) are timing charts describing an operation of an electric discharge machining apparatus according to a second embodiment of this invention.
Figure 5:
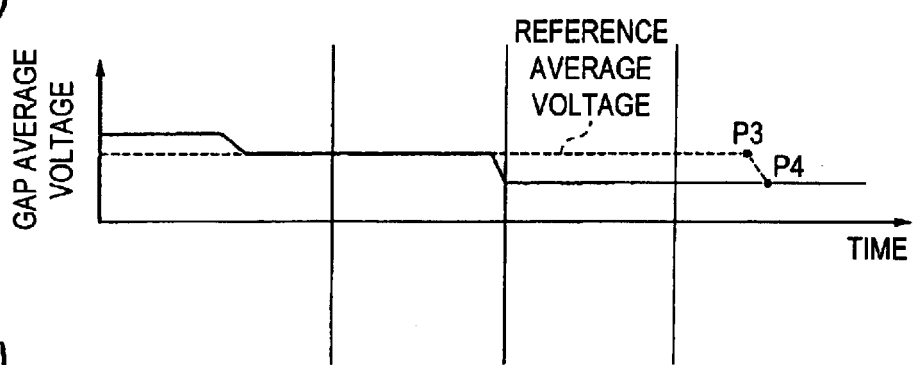
Figure 5:
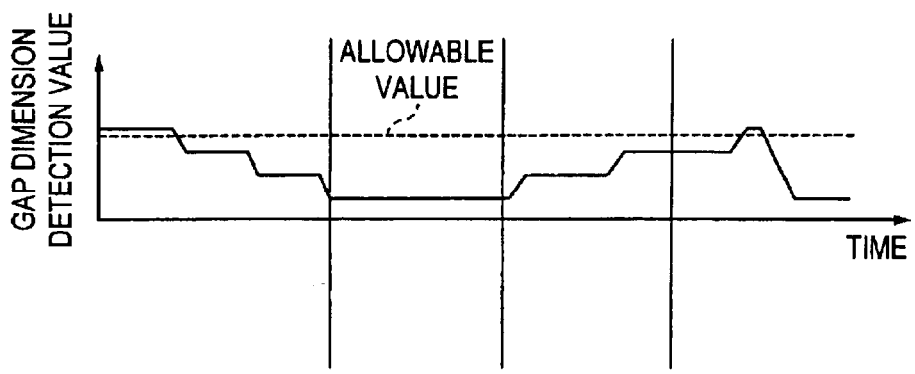
Figure 5:
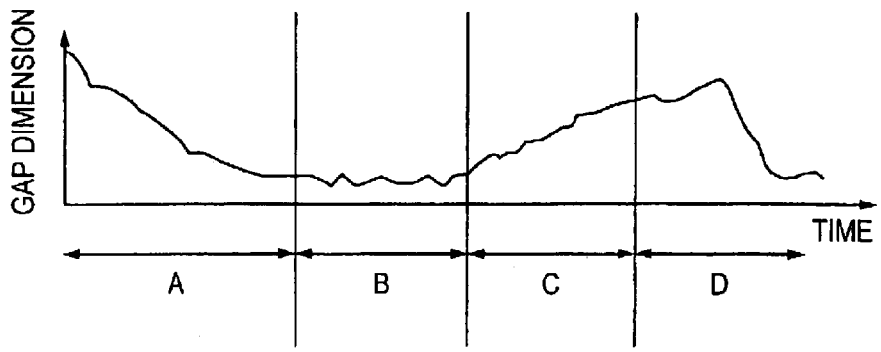
Figure 6:
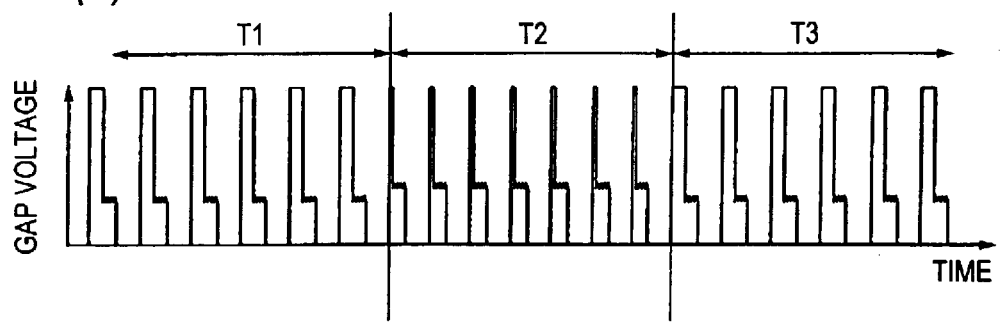
FIGS. 6(a) through 6(c) are explanatory diagrams showing a relation among a gap voltage, a gap average voltage and a gap dimension in conventional gap control.
Figure 6:
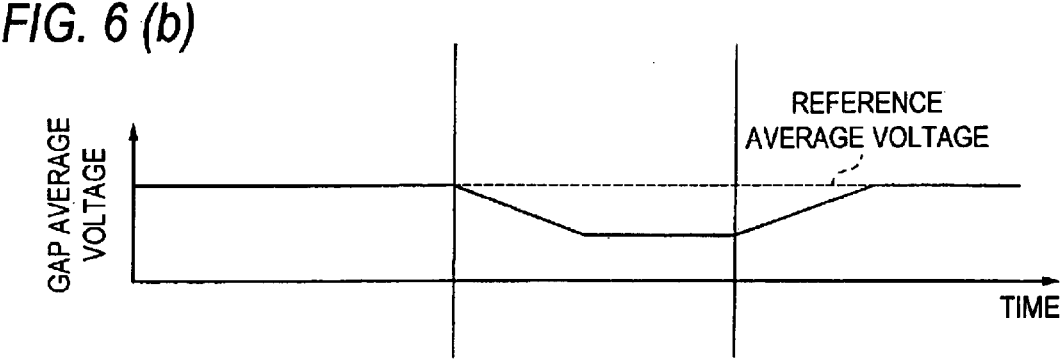
Figure 6:
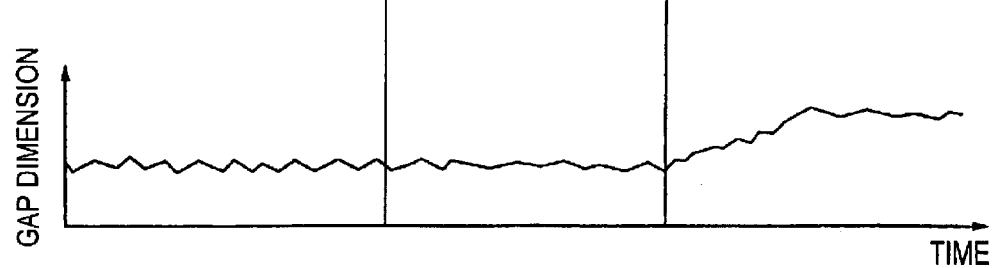

FIG. 5 is a timing chart describing an operation of the electric discharge machining apparatus according to the second embodiment of this invention, and FIG. 5(a) shows a gap voltage and FIG. 5(b) shows a gap average voltage and FIG. 5(c) shows a gap dimension detection value and FIG. 5(d) shows a gap dimension.

Intervals A to C of FIG. 5 are similar to those of FIG. 2 of the first embodiment.

In an interval D, the amount of work scraps present in the gap increases due to secondary electric discharge etc. through the work scraps further from the interval C and as a result of increasing the gap dimension in a manner similar to the interval C, the case that the gap dimension detection value has exceeded an allowable value (interval D of FIG.

5(c)) is shown. When the gap average voltage is smaller than a reference average voltage and the gap dimension is larger than the allowable value thus, the reference average voltage is changed smaller than an initial setting by the reference average voltage change means (P3→P4 of FIG. 5(b)) and the gap dimension is corrected to a value proper for electric discharge machining.

Thus, by using the reference average voltage change means for changing the reference average voltage smaller than the initial setting as the gap dimension correction means 13 and reducing the reference average voltage when the gap average voltage is smaller than the reference average voltage and the gap dimension is larger than the allowable value, control is performed so that the gap average voltage is approximated to this reference average voltage and it is controlled so that the gap dimension becomes within the allowable value.

Industrial Applicability

As described above, the electric discharge machining method and apparatus according to this invention are suitable for use in electric discharge machining operations.

What is claimed is:

1. An electric discharge machining method for machining a workpiece by supplying machining electric power to a gap between an electrode and the workpiece and performing control so as to approximate an average voltage of the gap to a predetermined reference average voltage, the method comprising:

correcting a dimension of the gap when the dimension of the gap is larger than a predetermined allowable value and the average voltage of the gap is smaller than the predetermined reference average voltage, wherein the gap dimension is calculated from a formula based on machining conditions.

2. An electric discharge machining method as defined in claim 1, wherein the predetermined allowable value is set according to machining conditions.

3. An electric discharge machining method as defined in claim 1, wherein the gap dimension is calculated from following formula:

$$G=(\in \cdot S)/C,$$

wherein $\in$ is a dielectric constant of the gap,

S is an opposed area between the electrode and the workpiece, and

C is calculated from the following formula:

$$Vr=E\cdot(1-\exp(-(t/RC))),$$

wherein

Vr is the reference voltage,

E is a machining electric power supply voltage, t is a rise time from voltage application to voltage Vr, and R is a resistance value of the machining electric power supply.

4. An electric discharge machining apparatus machining a workpiece by supplying machining electric power to a gap between an electrode and the workpiece, comprising:

gap dimension detection means for detecting a dimension of the gap, wherein the gap dimension detection means calculates the gap dimension from a formula based on machining conditions;

gap average voltage detection means for detecting an average voltage of the gap, gap dimension correction means for correcting the dimension of the gap, and gap dimension correction starting means for starting the gap dimension correction means when a first comparison between a gap dimension detected by the gap dimension detection means and a predetermined allowable value and a second comparison between a gap average voltage detected by the gap average voltage detection means and a predetermined reference average voltage are made and the gap dimension detected by the first comparison is larger than the predetermined allowable value and the gap average voltage detected by the second comparison is smaller than the predetermined reference average voltage.

5. An electric discharge machining apparatus as defined in claim 4, wherein the predetermined allowable value compared with the detected gap dimension is set according to machining conditions.

6. An electric discharge machining apparatus as defined in claim 4, wherein the gap dimension correction means is jump means for jumping the electrode relatively to the workpiece or means for jetting machining liquid in the gap.

7. An electric discharge machining apparatus as defined in claim 4, wherein the gap dimension correction means is reference average voltage change means for changing the reference average voltage smaller than an initial setting.

8. An electric discharge machining apparatus as defined in claim 4, wherein the gap dimension detection means calculates the gap dimension from the following formula:

$$G=(\in \cdot S)/C,$$

wherein $\in$ is a dielectric constant of the gap,

S is an opposed area between the electrode and the workpiece, and

C is calculated from the following formula:

$$Vr=E\cdot(1-\exp(-(t/RC))),$$

wherein

Vr is a reference voltage,

E is a machining electric power supply voltage, t is a rise time from voltage application to voltage Vr, and R is a resistance value of the machining electric power supply.

9. An electric discharge machining apparatus machining a workpiece by supplying machining electric power to a gap between an electrode and the workpiece, comprising:

gap dimension detection means for detecting a dimension of the gap, gap average voltage detection means for detecting an average voltage of the gap, gap dimension correction means for correcting the dimension of the gap, and gap dimension correction starting means for starting the gap dimension correction means when a first comparison between a gap dimension detected by the gap dimension detection means and a predetermined allowable value and a second comparison between a gap average voltage detected by the gap average voltage detection means and a predetermined reference average voltage are made and the gap dimension detected by the first comparison is larger than the predetermined allowable value and the gap average voltage detected by the second comparison is smaller than the predetermined reference average voltage, wherein the predetermined allowable value compared with the detected gap dimension is set to a calculation value by an experimental formula previously obtained according to machining conditions or a value in which this calculation value is multiplied by a predetermined coefficient.

10. An electric discharge machining apparatus as defined in claim 9, wherein the gap dimension correction means is jump means for jumping the electrode relatively to the workpiece or means for jetting machining liquid in the gap.

11. An electric discharge machining apparatus as defined in claim 9, wherein the gap dimension correction means is reference average voltage change means for changing the reference average voltage smaller than an initial setting.

* * * * *